Aug. 19, 1969 G. MONTICELLI 3,461,935

RESILIENT SELF-BLOCKING NUT

Filed Jan. 26, 1968

INVENTOR
Giulio Monticelli
BY Edwin E. Greigg
ATTORNEY

United States Patent Office 3,461,935
Patented Aug. 19, 1969

3,461,935
RESILIENT SELF-BLOCKING NUT
Giulio Monticelli, Via Savona 134,
Milan, Italy
Filed Jan. 26, 1968, Ser. No. 700,869
Claims priority, application Italy, Feb. 1, 1967,
Patent 791,673
Int. Cl. F16b 39/28
U.S. Cl. 151—21
4 Claims

ABSTRACT OF THE DISCLOSURE

An improved lock nut comprising a housing within which is provided a base plate, a stack of resilient thread-locking elements each of which has a bent portion lying outside the plane of the main body portion of the locking elements and a cap member arranged to hold the juxtaposed elements in relatively fixed relation.

---

There are known many systems tending to ensure that, when tightened on screws, nuts will not unloose due to shocks or vibrations they are subjected to.

It is also known that the most wide spread of such systems are comprised of resilient annual elements (washers) inserted in the screws and exerting a spring reaction between a nut base and a bearing plane.

The recurring realizations for attaining a reliable seal for the nuts indicate, however, that the aim is still pursued also in connection with the increasing stresses or vibrations of the devices connected by nuts and screws.

Accordingly, it is the object of the present invention to provide a novel device which is readily carried out and formed of a preferably hexagonal, non-hardened metal housing, opened or closed at the top and centrally drilled at the bottom, wherein one or more small plates of hardened steel or other suitable material are inserted, thus forming a resilient thread independent of the housing.

By this novel system a self-blocking nut is provided, which ensures the desired seal, at the same time avoiding any damages resulting from failure of hardened elements.

The device or self-blocking nut according to the present invention advantageously replaces the usual nuts and respective stop systems in those elements requiring a higher seal reliability.

The accompanying drawing diagrammatically shows by way of non-restrictive example an embodiment of the present invention, and more particularly:

Figure 1:
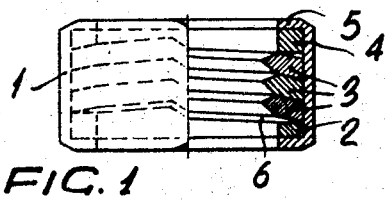
FIG. 1 is a sectional view of the device or self-blocking nut according to the present invention taken along the broken line V—V of FIG. 2.
Figure 2:
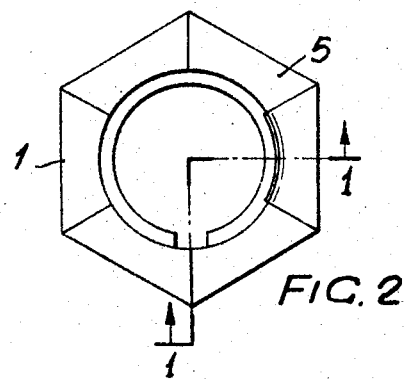
FIG. 2 is a top view of the device in FIG. 1.

Particularly referring to FIGS. 1–3 and 4, it will be seen that the device according to the present invention comprises within a hexagonal housing 1 a hexagonal bearing small plate 2, three hexagonal small plates 3 forming the thread for the device and a similarly hexagonal levelling small plate 4.

Housing 1 is closed at the top, so as to enclose a suitable center hole, and this is achieved by inwardly bending lugs 5 after inserting small plates 2–3–4 in said housing.

A hole through which the screw will pass is provided centrally of the base of said housing 1.

Figure 9:
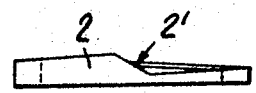
Figure 10:
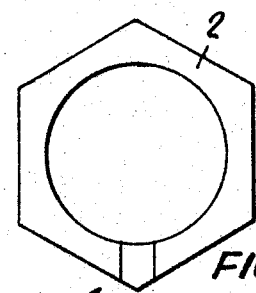

Centrally drilled small plate 2 (FIGS. 9 and 10) is flat at the bottom and helically shaped at the top at 2' (FIG. 9) according to the screw pitch.

Small plates 3, the first lower of which bears on small plate 2 and the other of which bear on the underlying small plate 3, form the thread for the device, by being properly shaped to the thread so as to freely bolt onto screw 7.

Figure 7:
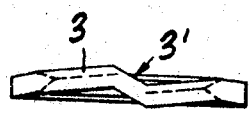
Figure 8:
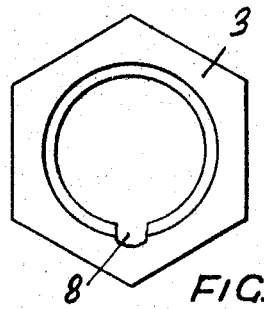

In the detailed illustrations (FIGS. 7 and 8) it is seen that the convolution formed by small plates 3 is interrupted by the angular or undulatory portion 3' (FIG. 7) at slot 8 (FIG. 8).

Moreover, small plates 3 are slightly drawn having a downward open cup, whereby a circular camber 6 is provided between said bearing small plate 2 and the overlying small plate 3.

Figure 5:
FIGS. 5–6–7–8–9–10 are views showing construction details.
Figure 6:
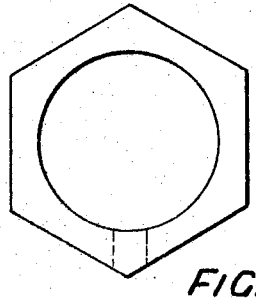

The lower surface of flat top small plate 4 (FIGS. 5 and 6) is complemental to the the shape of small plate 3, on which it will bear.

Small plates 2–3–4 should be inserted in housing 1 so as to attain a regular helical development, just as shown in FIGS. 1–3 and 4.

Figure 3:
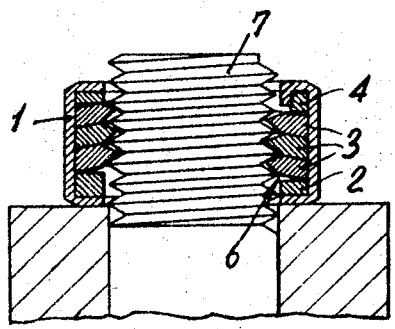
FIG. 3 is a vertical sectional view of the device as screwed on a screw prior to tightening.
Figure 4:
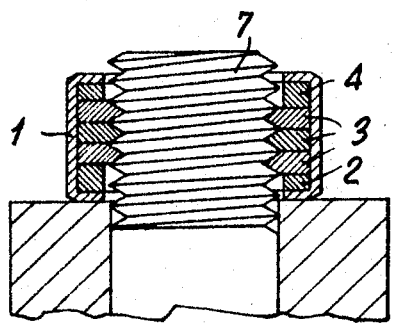
FIG. 4 is a vertical sectional view of the device as screwed on a screw after a close tightening.

Housing 1 can have lugs 5 protruding so as they can be bent on small plate 4 as shown in the section of FIGURE 3 at the right side. This permits to lower the price of housing because the housing 1 is obtained by shearing from a plate instead from drawing.

The operation of the above described device is as follows:

From FIGS. 1–3 and 4 it is seen that the device takes the form of a nut comprising a stack of washers having resilient convolutions 3 and include an angular portion 3' as well as top and bottom plates, all of which are assembled in juxtaposed relation in housing 1.

Such an arrangement of elements causes the convolutions forming the self-locking resilient nut assembly according to the present invention to be all brought into engagement on tightening of the nut on a threaded bolt.

The self-locking resilient nut assembly thus will be capable of being threaded as a unit and convolutions 3 of the device will retain the camber 6 (see FIGS. 1 and 3) until the nut is tightened on the bolt shank. During the tightening operation, convolutions 3 of said device being resilient are caused to deflect and on final tightening being completed the convolutions 3 will usually conform to the configuration of the helical bearing base plate 2.

Under these conditions the thread engaging plates 3 exert a high braking resilient reaction against all of the screw threads carried by a bolt shank and which are engaged by these plates, thus providing a reliable tightening of the self-locking nut onto the threaded bolt body.

Through the use of a proper number of resilient plates 3 it is possible to attain a sufficient spring reaction, without setting to zero camber 6 on completion of the tightening operation to meet particular elasticity requirements in the system.

This is attained by reducing the overall dimensions and the mounting or assembling times, since the customary lock washers are eliminated which are usually positioned on the bolt shank and between the nut base and bearing plane. The resilient elements 3 of the device, being enclosed within a housing, will prevent any damages as resulting from a failure thereof.

Besides those herein described, other expedients may be adopted to improve the device according to the invention, without departing for this from the scope of the present invention.

What is claimed is:

1. In a lock nut the combination comprising, polygonal housing provided with an axially extending central opening and top and bottom walls extending radially inwardly, first annular means positioned in said housing adjacent to the bottom wall, a stack of at least three independent resilient thread-locking members having an annular main body portion with the main body portion of one of said locking members superimposed on said first annular means, each of said locking members further including an integrated undulatory portion complemental to that of the adjacent member and lying at an angle relative to the main body portion, and a second annular means seated on said stack of locking members within said housing and in engagement with said top wall, said locking members having thread formations at their radially inner peripheries defining a generally continuous helical thread, said thread formations being uniformly inclined relative to the axis of said housing and extending radially inwardly beyond both said top and bottom walls and said first and second annular means for engagement with the threads on a mating male member, whereby said thread formations are resiliently flexed into axial alignment therewith.

2. In a lock nut according to claim 1, wherein the first annular means has at least one surface that is complemental to the configuration of the juxtaposed locking member.

3. In a lock nut according to claim 1, wherein the second annular means has at least one surface that is complemental to the configuration of the locking member lying adjacent thereto.

4. In a lock nut according to claim 1, wherein the complementally formed undulatory portions of each of the thread locking members lie in the same plane.

References Cited

UNITED STATES PATENTS

| | | | |
|---|---|---|---|
| 625,529 | 5/1899 | Andress | 151—35 |
| 1,228,671 | 6/1917 | Hibbard | 151—22 |
| 2,386,197 | 10/1945 | Dawson | 151—22 |
| 2,540,759 | 2/1951 | Schneider | 151—22 |

RAMON S. BRITTS, Primary Examiner

U.S. Cl. X.R.

151—22